(12) United States Patent
Li et al.

(10) Patent No.: US 12,420,849 B2
(45) Date of Patent: Sep. 23, 2025

(54) HEAVY-HAUL TRAIN AND LONGITUDINAL DYNAMICS TRACTION OPERATION OPTIMIZATION CONTROL SYSTEM AND METHOD THEREOF

(71) Applicants: CENTRAL SOUTH UNIVERSITY, Hunan (CN); NATIONAL RAILWAY ADMINISTRATION EQUIPMENT TECHNOLOGY CENTER, Beijing (CN); SCIENCE AND TECHNOLOGY RESEARCH INSTITUTE OF DAQIN RAILWAY CO., LTD., Shanxi (CN); CHANGSHA NANRUI RAIL TRANSPORT ELECTRIC EQUIPMENT CO., LTD., Hunan (CN)

(72) Inventors: Wei Li, Hunan (CN); Songxu Wang, Beijing (CN); Yongsheng Yu, Shanxi (CN); Wenlu Zhang, Hunan (CN); Jianhua Wu, Shanxi (CN); Guozhong Chen, Hunan (CN); Kai Wang, Hunan (CN)

(73) Assignees: Central South University, Hunan (CN); National Railway Administration Equipment Technology Center, Beijing (CN); Science and Technology Research Institute of Daqin Railway Co., Ltd., Shanxi (CN); Changsha Nanrui Rail Transport Electric Equipment Co., Ltd., Hunan (CN)

( * ) Notice: Subject to any disclaimer, the term of this patent is extended or adjusted under 35 U.S.C. 154(b) by 0 days.

(21) Appl. No.: 18/568,643

(22) PCT Filed: Feb. 27, 2023

(86) PCT No.: PCT/CN2023/078438
§ 371 (c)(1),
(2) Date: Dec. 8, 2023

(87) PCT Pub. No.: WO2023/126023
PCT Pub. Date: Jul. 6, 2023

(65) Prior Publication Data
US 2024/0336289 A1     Oct. 10, 2024

(30) Foreign Application Priority Data
Dec. 30, 2021   (CN) .......................... 202111652604.0

(51) Int. Cl.
*B61L 23/08*     (2006.01)
*B61L 15/00*     (2006.01)

(52) U.S. Cl.
CPC ........... *B61L 23/08* (2013.01); *B61L 15/0018* (2013.01)

(58) Field of Classification Search
CPC ...... B61C 15/14; B61L 15/0018; B61L 23/08; B60L 15/38; B60L 2200/26
See application file for complete search history.

(56) References Cited

U.S. PATENT DOCUMENTS 9,296,379 B2 *   3/2016   Oswald ................. B60T 17/228
11,205,124 B1 *  12/2021  Yang ..................... G05B 13/042
(Continued)

FOREIGN PATENT DOCUMENTS

| CN | 102267480 A | 12/2011 |
| CN | 105835913 A | 8/2016 |

(Continued)

OTHER PUBLICATIONS

English abstract of CN102267480A.
(Continued)

*Primary Examiner* — Carl C Staubach
(74) *Attorney, Agent, or Firm* — Caesar Rivise, PC (57) ABSTRACT

Disclosed in the present invention are a heavy-haul train and a longitudinal dynamics traction operation optimization con-
(Continued)

trol system and method thereof. A model prediction function is added to a locomotive wireless double heading system so as to suppress large longitudinal impulse that is likely to be generated when the operation speed of the heavy-haul combined train is regulated, especially when the heavy-haul train is switched at a grade change point working condition, and the major potential safety hazard that affects the safe and stable operation of the heavy-haul combined train is avoided. In a distributed dynamic marshalling mode of the heavy-haul combined train, the requirements for the difference between the tractive force and the regenerative braking force of a master locomotive and slave locomotives of a multi-locomotive under the same working condition are predicted by the model, the amplitude of the power for the traction and the regenerative braking of the master locomotive and the slave locomotives is reasonably adjusted, and asynchronous control of the train under different working conditions is gradually achieved, so that the purposes of optimizing the dynamics performance of the heavy-haul combined train and reducing the longitudinal impulse of the heavy-haul train are achieved, and the operation of the train is guaranteed.

19 Claims, 3 Drawing Sheets

(56) References Cited

U.S. PATENT DOCUMENTS

| | | | | |
|---|---|---|---|---|
| 12,091,008 | B2* | 9/2024 | Park | B60W 30/09 |
| 2010/0250083 | A1* | 9/2010 | Takahashi | B60W 10/18 |
| | | | | 701/70 |
| 2014/0188375 | A1* | 7/2014 | Kumar | G06F 17/00 |
| | | | | 701/117 |
| 2016/0306360 | A1* | 10/2016 | Seaton | B61L 3/127 |
| 2017/0232943 | A1* | 8/2017 | Brooks | G08G 1/22 |
| | | | | 701/19 |
| 2017/0305396 | A1* | 10/2017 | Shiratsuchi | B61L 23/14 |
| 2018/0322791 | A1* | 11/2018 | Brooks | B61C 17/12 |

FOREIGN PATENT DOCUMENTS

| | | |
|---|---|---|
| CN | 111591318 A | 8/2020 |
| CN | 114633780 A | 6/2022 |

OTHER PUBLICATIONS

English abstract of CN105835913A.
English abstract of CN111591318A.
English abstract of CN114633780A.
International Search Report from corresponding PCT Application No. PCT/2023/078438 dated Apr. 29, 2023.

* cited by examiner

HEAVY-HAUL TRAIN AND LONGITUDINAL DYNAMICS TRACTION OPERATION OPTIMIZATION CONTROL SYSTEM AND METHOD THEREOF

This application is a U.S. National Phase Application of PCT/CN/2023/078438, filed Feb. 27, 2023, which claims priority to Chinese Patent Application No. 202111652604.0, filed on Dec. 30, 2021, which is incorporated by reference in its entirety.

FIELD OF THE INVENTION

The present invention relates to a control technology for dynamics performance optimization of long and large heavy-haul combined trains when operating on complex lines, in particular to a heavy-haul train and a longitudinal dynamics traction operation optimization control system and method thereof.

BACKGROUND OF THE INVENTION

Longitudinal dynamics traction operation performance optimization of heavy-haul combined trains and distributed dynamic traction matching control of multi-locomotives thereof have always been one of the key scientific issues in heavy-haul traction. Many major accidents of the heavy-haul combined trains are closely related to the deterioration of longitudinal force during train traction operation, which affects the safety of train operation.

Based on exiting wireless double heading traction control methods for locomotives, slave control locomotives in the middle of a heavy-haul combined train follow a master control locomotive at the head. Generally, distributed dynamic traction control on locomotives can reduce the longitudinal force of trains and improve the operational quality of trains. However, in cases of line grade change points, electric locomotive passing neutral section and faults, the distributed dynamic double heading control sometimes cannot suppress the deterioration of longitudinal force under specific working conditions of trains, and excessive front and rear impulses of locomotives in the train will change the longitudinal force of couplers under abnormal faults to seriously cause train separation. At present, complex train operation methods can only be developed to guarantee operational safety, and problems cannot be fundamentally solved.

SUMMARY OF THE INVENTION

In response to the shortcomings of existing technologies, the technical problem to be solved by the present invention is to provide a heavy-haul train and a longitudinal dynamics traction operation optimization control system and method thereof, to suppress significant longitudinal impulses that may occur when the operation speed of a heavy-haul combined train is regulated, especially when a long and large train is switched at a grade change point working condition. To solve the above technical problem, the technical solution employed by the present invention is as follows: A longitudinal dynamics traction operation optimization control system for a heavy-haul train, including:

a motion dynamics model, with control instructions of the train as input, an optimization goal of reducing longitudinal impulse, and desired traction/electrical braking force as output;

an expert system, with the desired traction/electrical braking force output by the motion dynamics model, output of an optimization output and feedback module as input, to adjust the desired traction/electrical braking force and feed back adjustment results to the motion dynamics module;

a prediction model, with the desired traction/electrical braking force output by the expert system as input, to set an objective function and predict traction/electrical braking force; and an optimization output and feedback module, configured to adjust traction/electrical braking force of the train according to the traction/electrical braking force predicted by the prediction model, and feed back the adjusted traction/electrical braking force and real-time monitored coupler force to the expert system.

The present invention adds a model prediction function to a locomotive wireless double heading system to suppress significant longitudinal impulses that may occur when the operation speed of the heavy-haul combined train is regulated, especially when the long and large train is switched at a grade change point working condition, so as to overcome major safety hazards that affect the safe and stable operation of the heavy-haul combined train.

To further optimize the control effect, the system of the present invention further includes: a data collection module, configured to collect a traction vehicle type, a traction marshaling mode, vehicle model difference data, traction features, traction conditions, electrical braking conditions, line signals, driving permit information, and a train speed in a distributed power marshaling mode of the heavy-haul combined train, where the input of the expert system further includes the data collected by the data collection module.

In the present invention, an expression of the objective function set by the prediction model is:

$$\min J(k) = \sum_{i=1}^{p} q_i [F_p(k+i) - F_r(k+i)]^2 + \sum_{j=1}^{M} r_j u^2(k);$$

where $F_r(k+i)$ is desired traction/electrical braking force obtained by the expert system at time k+i, expressed as: $F_r(k+i)=(1-\alpha')F_r(k)+\alpha^i F(k)$; $F(k)$ is actual traction/electrical braking force at time k; $\alpha^i$ is a flexibility coefficient computed by the expert system based on train load; $r_j$ is a weighting coefficient, $u(k)=(G_1^T Q G_1 - R)^T G^T Q[F_r(k+1) - G_2 u(k-1) - He(k)]$, $Q=\text{diag}[q_1, q_2, \ldots, q_p]$, and $q_1, q_2, \ldots, q_p$ are predicted error weighting coefficients; $R=\text{diag}[r_1, r_2, \ldots, r_p]$, and $r_1, r_2, \ldots, r_p$ are control quantity weighting matrices; $H=[h_1, h_2, \ldots, h_p]^T$, and $h_1, h_2, \ldots h_p$ are feedback coefficient matrices; $G=[g_1, g_2, \ldots, g_p]^T$, $g_1, g_2, \ldots, g_p$ are impulse response coefficient matrices, $G_1$ is an impulse coefficient matrix for predicting future conditions, and $G_2$ is an impulse coefficient matrix for past known conditions; M is a control time domain length; p is a predicted time domain length; e(k) is a prediction error at time k; $F_p(k)=F_m(k)+He(k)$; $e(k)=F(k)-F_m(k)$; $F_m(k)$ is predicted output at time k.

In the present invention, the shortcoming of large on-line computational quantity is overcome by model prediction, and desired double heading locomotive traction/electrical braking force can be quickly obtained to form an optimization trajectory. The balance of longitudinal force between vehicles is used as a target optimization function, and the traction/electrical braking force of each double heading locomotive is adjusted in real time through model prediction optimization control, thereby reducing longitudinal interaction between train vehicles and ensuring driving safety.

An expression of the traction/electrical braking force $F_m(k+i)$ predicted by the prediction model at time k+i is:

$$F_m(k+i) = \sum_{i=1}^{p}(Gu(k+i-1) + e(k+i)),$$

where u(k+i−1) is an optimization control rate at time k+i−1.

The control time domain length M is set to 1<M<p. A train operation process between two signal generators is selected as the control time domain M. The predicted time domain length p is a length of a block section. Although a prediction interval is limited, considering the low operating speed of the heavy-haul train, setting M to 1<M<p can greatly reduce the computational quantity of the system and ensure real-time performance and robustness of collaborative control on the heavy-haul combined train.

A value range of $\alpha^i$ is 0.2 to 0.6; and a range value of $r_j$ is 0.3 to 0.5. The values are selected according to the linear interpolation of the expert system based on train load (5000 tons to 30000 tons), which reduces the computational quantity and can dynamically reflect train traction load factors directly related to longitudinal force of the train.

The system of the present invention further includes a feature feedback module, configured to detect the longitudinal force of the train and divide operation conditions of the train into normal conditions and abnormal conditions, where output of the feature feedback module is connected to the expert system.

The system of the present invention further includes an abnormality constraint module, configured to identify abnormal operation conditions of the train and provide safety protection, where output of the abnormality constraint module is connected to the expert system.

As an inventive concept, the present invention further provides a locomotive wireless double heading control unit, embedded with the foregoing optimization control system.

As an inventive concept, the present invention further provides a double heading train, including the foregoing locomotive wireless double heading control unit.

As an inventive concept, the present invention further provides a longitudinal dynamics traction operation optimization control method for a heavy-haul train, including the following steps: setting the following objective function:

$$\min J(k) = \sum_{i=1}^{p} q_i [F_p(k+i) - F_r(k+i)]^2 + \sum_{j=1}^{M} r_j u^2(k);$$

where $F_r(k+i)$ is desired traction/electrical braking force at time k+i, expressed as: $F_r(k+i)=(1-\alpha')F_r(k)+\alpha^i F(k)$; F(k) is actual traction/electrical braking force at time k; $\alpha^i$ is a flexibility coefficient computed based on train load; $r_j$ is a weighting coefficient, $u(k)=(G_1^T QG_1 - R)^T G^T Q[F_r(k+1) - G_2 u(k-1) - He(k)]$, $Q=\text{diag}[q_1, q_2, \ldots, q_p]$, and $q_1, q_2, \ldots, q_p$ are predicted error weighting coefficients; $R=\text{diag}[r_1, r_2, \ldots, r_p]$, and $r_1, r_2, \ldots, r_p$ are control quantity weighting matrices; $H=[h_1, h_2, \ldots, h_p]^T$, and $h_1, h_2, \ldots h_p$ are feedback coefficient matrices; $G=[g_1, g_2, \ldots, g_p]^T$, $g_1, g_2, \ldots, g_p$ are impulse response coefficient matrices, $G_1$ is an impulse coefficient matrix for predicting future conditions, and $G_2$ is an impulse coefficient matrix for past known conditions; M is a control time domain length; p is a predicted time domain length; e(k) is a prediction error at time k; $F_p(k)=F_m(k)+He(k)$; $e(k)=F(k)-F_m(k)$; $F_m(k)$ is predicted output at time k; and adjusting traction/electrical braking force of the train according to the traction/electrical braking force predicted at time k+i.

Compared with the existing technologies, the present invention has the following beneficial effects: an expert system model for predicting the variation and development law of train operation dynamics is built according to longitudinal dynamics of a locomotive double heading traction heavy-haul combined train under the disturbance of slave control locomotive working conditions, combined with a nonlinear relationship between longitudinal dynamics of heavy-haul train traction operation and double heading control under line conditions; and future development trends are inferred according to the inertia of train states to optimize train traction dynamics performance, so as to form traction operation longitudinal dynamics quality optimization, double heading constraint control, and model prediction control methods for heavy-haul combined trains. With an optimization goal of balancing the longitudinal force during the operation of the combined train, requirements for differences between traction and regenerative braking force of master and slave locomotives of a multi-locomotive under the same working condition are predicted by the model in real time, then the amplitude of power for traction and regenerative braking of the master and slave locomotives is reasonably and safely adjusted, and asynchronous control of the train under different working conditions is gradually achieved according to operating conditions, so that the purposes of optimizing dynamics performance of a long and large combined train and reducing longitudinal impulses of a heavy-haul train are achieved. The present invention suppresses significant longitudinal impulses that may occur when the operation speed of the heavy-haul combined train is regulated, especially when the long and large train is switched at a grade change point working condition, and overcomes major safety hazards that affect the safe and stable operation of the heavy-haul combined train. The system of the present invention can be adaptively refitted on a conventional locomotive wireless double heading system, with significant effects and low costs. The system is suitable for promotion and application in heavy-haul combined trains, thereby obtaining good economic benefits.

DETAILED DESCRIPTION OF THE EMBODIMENTS

In embodiments of the present invention, a traction and electrical braking collaborative processing module based on model prediction is embedded in a locomotive wireless double heading control unit, to achieve an optimization goal of balancing longitudinal force when a long and heavy-haul combined train operates, so as to optimize dynamics performance of the train and reduce longitudinal impulse of the train, including:

(1) Build a traction and electrical braking collaborative processing system based on model prediction, including 3 parts: 1. a data input collection module in communication with locomotive electrical interfaces and a vehicle network to collect and summarize data and conditions required for model prediction; 2. a core prediction module composed of an expert system and a dynamics model for centrally processing input information and feedback data, importing the data into an algorithm model described in implementation (5) for computation and derivation, and obtaining optimal combined prediction adjustment parameters after multiple iterations; and 3. an optimization output and feedback module for adjusting parameters of traction/electrical braking control optimization strategies exported by a prediction model, then outputting the parameters, importing feedback locomotive traction force/electrical braking force, coupler force measurement values obtained by an external auxiliary coupler stress measurement device, and other data into the core prediction module again, and performing closed-loop adjustment optimization in combination with the algorithm model described in implementation (5).

(2) Build a core prediction module of a traction and electrical braking collaborative processing model based on model prediction, including a three-layer model structure: 1. A motion dynamics model, which mainly processes computation and processing based on longitudinal dynamics of the long and heavy-haul freight train [Reference: written by Geng Zhi-xiu, Daqin Railway Heavy-haul Transport Technology [M]. Beijing: China Railway Publishing House, 2009.], to reduce longitudinal impulse as an optimization goal, where derived optimization results are used as input conditions for a second-layer expert prediction model. 2. The expert prediction model, including four core modules: an expert system [Reference: Li Wei. The key Technology Research and Application of Locomotive Wireless Remote Multi-traction Synchronous Control for Heavy-haul Train [D]. Central South University, 2012.], model prediction, feature feedback, and abnormality constraint [Reference: Li Wei, Chen Te-fang, Chen Chun-yang, Cheng Shu. Research on Multi-Sensors Distributed Fault Diagnosis Theory of Locomotive Electric System [J]. Journal of Railways, 2010, 32(5): 70-76.], to form a core prediction model including prediction judgment, feature feedback, and abnormal handling. 3. A feedback feature module, which serves as a data interface for closed-loop adjustment and can collect optimized feedback data into the core prediction module. A correlation among the three layers is as follows: the first-layer motion dynamics model and the third-layer feedback feature module simultaneously input condition parameters to the second-layer expert prediction model, and the second-layer expert prediction model derives collaborative optimization control parameters and feeds back computed results to the first-layer motion dynamics model, where the second-layer expert prediction model is a main computation and decision-making layer.

(3) Import seven types of data sources to build the traction and electrical braking collaborative processing model based on model prediction, including: a traction vehicle, a traction marshaling mode, differences in locomotive models, traction characteristics, traction conditions, electrical braking conditions, line signals and driving permits, where the seven types of data are key data parameters evaluated through long-term experience accumulation in wireless double heading operation data of heavy-haul combined freight trains, are mainly divided into three classes including locomotive working conditions, line signals and marshaling operation, and have a crucial impact on dynamics optimization control of heavy-haul combined trains.

(4) Build the traction and electrical braking collaborative processing model based on model prediction, which requires closed-loop control adjustment on output optimization parameters, where the parameters exported by the core prediction model are combined with driving control strategies to output adjustment on traction force/electrical braking force through locomotive electrical interfaces and network control interfaces, ultimately power control for the entire train is formed, and the system feeds back longitudinal force data to the feedback feature module through a vehicle coupler force feedback module to achieve a data closed-loop path of output results and feedback information.

Figure 3:
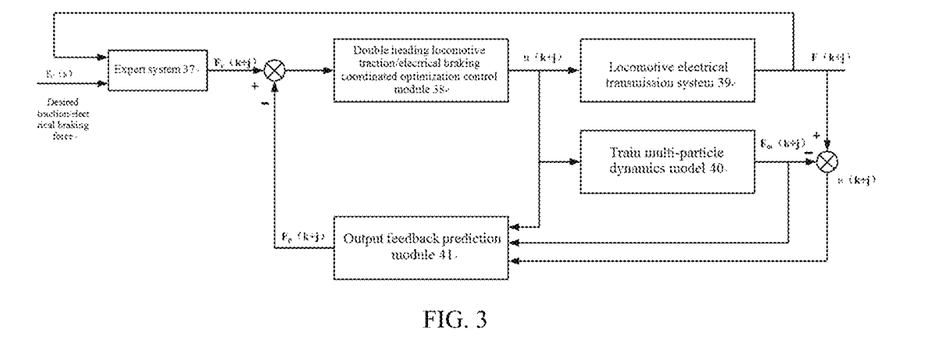
FIG. 3 is an algorithm framework diagram of a core prediction model according to an embodiment of the present invention.

(5) Build a traction and electrical braking collaborative processing algorithm framework based on model prediction according to an existing train multi-particle dynamics model [Literature: written by Geng Zhi-xiu, Daqin Railway Heavy-haul Transport Technology [M]. Beijing: China Railway Publishing House, 2009.] and in combination with optimal control theories, so that a predicted exported locomotive traction/electrical braking force output value F(k) (actual output) conforms to a goal of dynamics optimization control, as shown in FIG. 3.

① In response to the shortcoming of large on-line computational quantity in model prediction, in the embodiments of the present invention, in combination with the model prediction theory [References: written by Chen Hong. Model Prediction Control [M]. Beijing: Science Press, 2021. Written by Li Guo-yong and Yang Li-juan. Neural Fuzzy Prediction Control and MATLAB Implementation Therefore (4$^{th}$ Edition) [M]. Beijing: Electronic Industry Press, 2018.], input desired output $F_c(k)$ into the expert system to directly obtain desired traction/electrical braking force $F_r(k+i)$:

$$F_r(k+i) = (1 - \alpha^i)F_r(k) + \alpha^i F(k);$$

where α is an adjustment flexibility coefficient of the expert system, and p is a predicted time domain length. In this case, a range of α is 0.2 to 0.6 according to predicted lengths $\alpha^1$, $\alpha^2$, $\alpha^3$, . . . , $\alpha^i$ and linear interpolation of the expert system based on train load (5000 tons to 30000 tons). The predicted time domain length p is a length of a block section to ensure real-time performance and robustness of collaborative control on the heavy-haul combined train.

② A collaborative traction/electrical braking optimization control rate of multi-locomotives, where the optimization performance aims at balancing the longitudinal force of the heavy-haul combined train, and an objective function indicator is determined as follows:

$$\min J(k) = \sum_{i=1}^{p} q_i [F_p(k+i) - F_r(k+i)]^2 + \sum_{j=1}^{M} r_j u^2(k);$$

where M is a control time domain, and a train operation process between two signal generators is selected as the control time domain, and 1<M<p; $r_j$ is a weighting coefficient, and a range of r is 0.3 to 0.5 according to the linear interpolation of the expert system based on train load (5000 tons to 30000 tons).

Model Prediction Optimization Control Rate:

$$u(k) = (G_1^T Q G_1 + R)^T G^T Q[F_r(k+i) - G_2 u(k-1) - He(k)],$$

where $Q=\text{diag}[q_1, q_2, \ldots, q_p]$ is a prediction error weighting coefficient selected according to a ratio of coupler force to maximum bearing force;

$R=\text{diag}[r_1, r_2, \ldots, r_p]$ is a control quantity weighting matrix, which limits drastic changes in control increment and is achieved by adjusting the foregoing r;

$H=[h_1, h_2, \ldots, h_p]^T$ is a feedback coefficient matrix determined according to a state feedback structure of a locomotive electrical system and a control system;

$G=[g_1, g_2, \ldots, g_p]^T$ is a pulse response coefficient, which describes a dynamic output feature of the system over finite sampling periods.

③ Prediction error:

$$e(k) = F(k) - F_m(k)$$

④ Feedback prediction:

$$F_p(k) = F_m(k) + He(k)$$

⑤ Output prediction:

$$F_m(k+i) = \sum_{j=1}^{M}(Gu(k+i-1) + e(k+i))$$

The above prediction algorithm modules are imported into the algorithm framework shown in FIG. 3 to form a prediction optimization control target value, and the target value will be imported into the optimization output and feedback module for subsequent operations.

Figure 2:
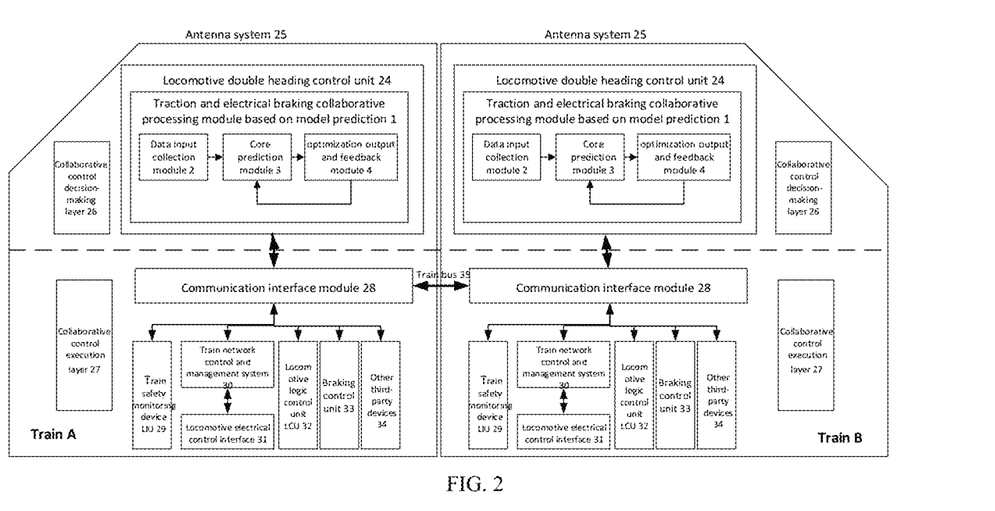
FIG. 2 is a network topology structure diagram of a system and related devices according to an embodiment of the present invention.

(6) Build a traction and electrical braking collaborative processing model based on model prediction, as shown in FIG. 2, including a two-level device network structure, where the lower level is a collaborative control execution layer, which receives locomotive working conditions, line signals and marshaling operation data through locomotive electrical interfaces and network communication interfaces, and exports electrical control instructions after protocol analysis by a locomotive network control system and processing by a locomotive logic control unit to the locomotive wireless double heading control unit to implement optimization control on the heavy-haul combined train; and the upper level is a collaborative control decision-making layer, and data of each vehicle device management layer are integrated by the collaborative control decision-making layer, imported by models, computed by prediction algorithms, and transmitted on a train level by a wireless communication and protocol processing module to implement train-level collaborative decision-making control. Parameters such as horizontal acceleration, vertical acceleration, and longitudinal acceleration are obtained by locomotive dynamics detection devices, the parameters are transmitted to the locomotive wireless double heading control unit for real-time analysis in combination with the expert system, the parameters are also output to a locomotive microcomputer control system and a locomotive wireless double heading synchronous control system for optimization control in combination with double heading operation conditions, and fault warning, safety guidance, and the like are performed.

Embodiment 1

Figure 1:
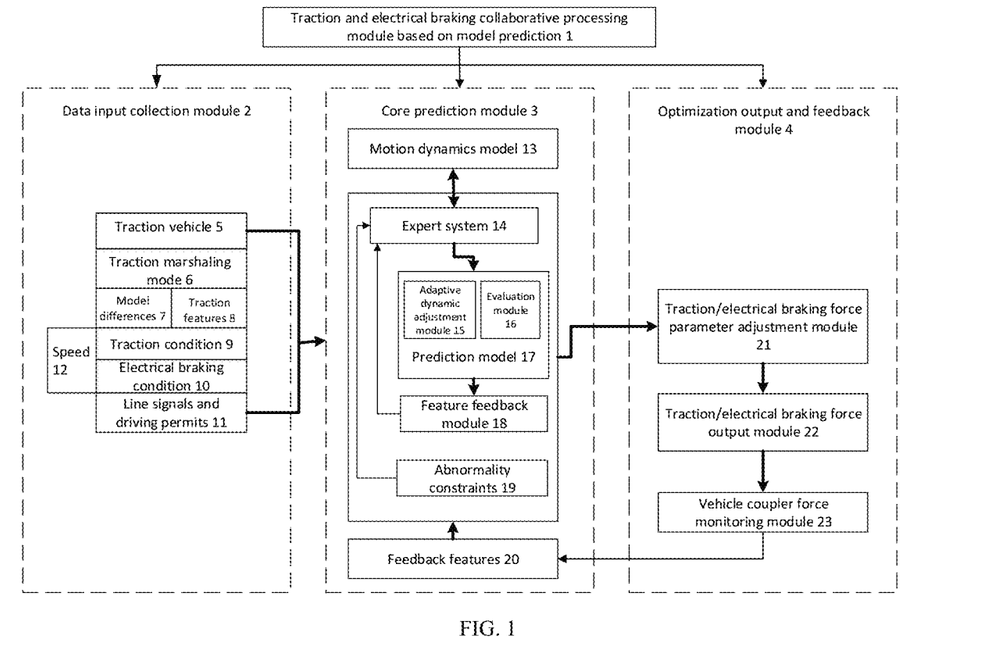
FIG. 1 is a structure diagram of a control system according to an embodiment of the present invention.
Figure 5:
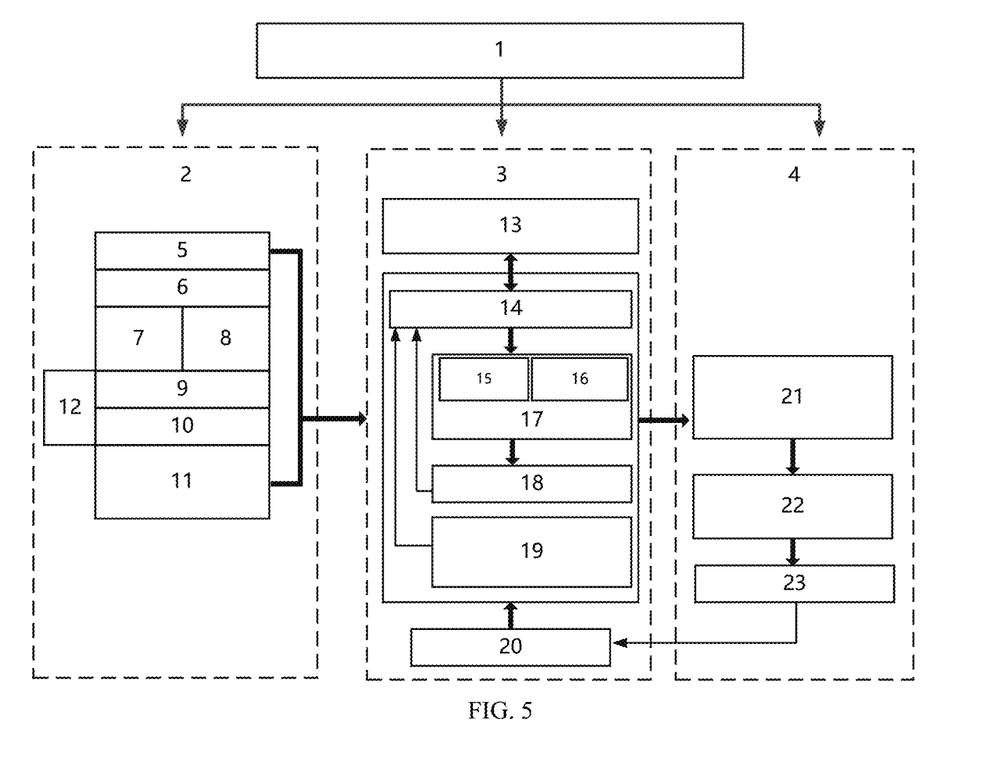
FIG. 5 is a structural diagram of an optimized control system according to an embodiment of the present invention.

As shown in FIG. 1 and FIG. 5, an optimization control method and system included in Embodiment 1 of the present invention may include a traction and electrical braking collaborative processing module based on model prediction 1, including a data input collection module 2, a core prediction module 3, and an optimization output and feedback module 4. The system is divided into three parts. The first part builds the data input collection module 2, the second part builds the core prediction module 3, and the second part builds the optimization output and feedback module 4. A correlation among the three parts is as follows: the data input collection module 2 exports collected locomotive working conditions, line signals and marshaling related data to the core prediction module 3, the core prediction module 3 exports result data to the optimization output and feedback module 4, and the optimization output and feedback module 4 exports optimization feedback data to the core prediction module 3.

The data input collection module 2 includes three major classes, totally 7 types of key imported data, including locomotive working conditions, line signals and marshaling data. The locomotive working condition data include: a traction condition 9, an electrical braking condition 10, and a speed 12; the line signals include: line signals and driving permits 11; and the marshaling data include: a traction vehicle 5, a traction marshaling mode 6, model differences 7, and traction features 8. The three classes of data are integrated and summarized, and then imported into the core prediction module 3 to generate algorithm model conditions. The core prediction module 3 includes a motion dynamics model 13, an expert system 14, a prediction model 17, a feature feedback module 18, abnormality constraints 19, and feedback features 20. The prediction model 17 is a core module composed of an adaptive dynamic adjustment module 15 and an evaluation module 16. The data imported by the data input collection module 2 first enter the motion dynamics model 13 to form a heavy-haul combined train model based on the imported data, which is then imported into the expert system 14. The expert system 14 is a system model built to predict the variation and development law of train operation dynamics based on longitudinal dynamics of a locomotive double heading traction heavy-haul combined train under the disturbance of middle slave control locomotive working conditions, combined with a nonlinear relationship between longitudinal dynamics of heavy-haul train traction operation and double heading control under line conditions. The model exported by the expert system 14 will be imported into the prediction model 17. The prediction model takes balance of longitudinal force during operation of the combined train as an optimization goal, exports predicted optimization feature value results, imports the results into the expert system 14 reversely by the feature feedback module 18 for internal correction, performs internal warning on predicted abnormalities, and imports the results into the expert system 14 reversely by the abnormality constraints 19 for internal correction, so that predicted optimization feature values constantly approach optimal ranges. Meanwhile, the feedback feature module 20 also collects the actual optimization output results and import the results into the core prediction module for closed-loop adjustment control.

The optimization output and feedback module 4 includes a traction/electrical braking force parameter adjustment module 21, a traction/electrical braking force output module 22, and a vehicle coupler force monitoring module 23. The optimization feature values exported by the core prediction module 3 will be imported into the traction/electrical braking force parameter adjustment module 21 for dynamic matching of traction/electrical braking force to form control instructions, which are transmitted to the traction/electrical braking force output module 22 to form power distribution of the entire train. Meanwhile, the vehicle coupler force monitoring module 23 monitors dynamics parameters of couplers and transmits monitoring data to the feedback feature module 20 and the core prediction module 3.

Embodiment 2

As shown in FIG. 2, Embodiment 2 of the present invention includes a topological connection relationship between system devices of two internal double heading locomotives when the system is implemented on the locomotives. A traction and electrical braking collaborative processing module based on model prediction 1 is embedded in a locomotive double heading control unit 24, or a traction and electrical braking feature processing module in a locomotive wireless double heading control unit 24 is transformed into a traction and electrical braking collaborative processing module based on model prediction 1. The invention example of the traction and electrical braking collaborative processing module based on model prediction 1 is detailed in Embodiment 1.

The traction and electrical braking collaborative processing module based on model prediction 1 communicates with locomotive devices through a communication interface module 28 for information instruction transmission and data exchange, including communication between the communication interface module 28 and a train safety monitoring device LKJ 29 to obtain line signals and driving permits, data transmission and exchange between the communication interface module 28 and a train network control and management system 30, indirect collection of driving locomotive electrical control interface signals, data transmission and exchange between the communication interface module 28 and a locomotive logic control unit 32, data transmission and exchange between the communication interface module 28 and a braking control unit 33, and data transmission and exchange between the communication interface module 28 and other third-party devices 34. The two locomotives exchange double heading data through a train bus 35.

Embodiment 3

As shown in FIG. 3, the embodiment of the present invention builds a prediction model and algorithms in the core prediction module 3. Desired input $F_c(k)$ is imported into the expert system 37, and the expert system 37 imports a computed result value $F_r(k+j)$ into a double heading locomotive traction/electrical braking coordinated optimization control module 38 by combining a feedback value of an output feedback prediction module 41. An output result value u(k+j) is transmitted to a locomotive electrical transmission system 39 for execution, a train multi-particle dynamics model 40 performs train-level dynamics deduction, and results values F(k+j) and $F_m(k+j)$ exported by the two are combined to generate a parameter e(k+j). The output feedback prediction module 41 summarizes the three parameters u(k+j), $F_m(k+j)$ and e(k+j) to output a feedback result value $F_r(k+j)$, which is provided to the double heading locomotive traction/electrical braking coordinated optimization control module 38 for feedback correction.

Embodiment 4

Figure 4:
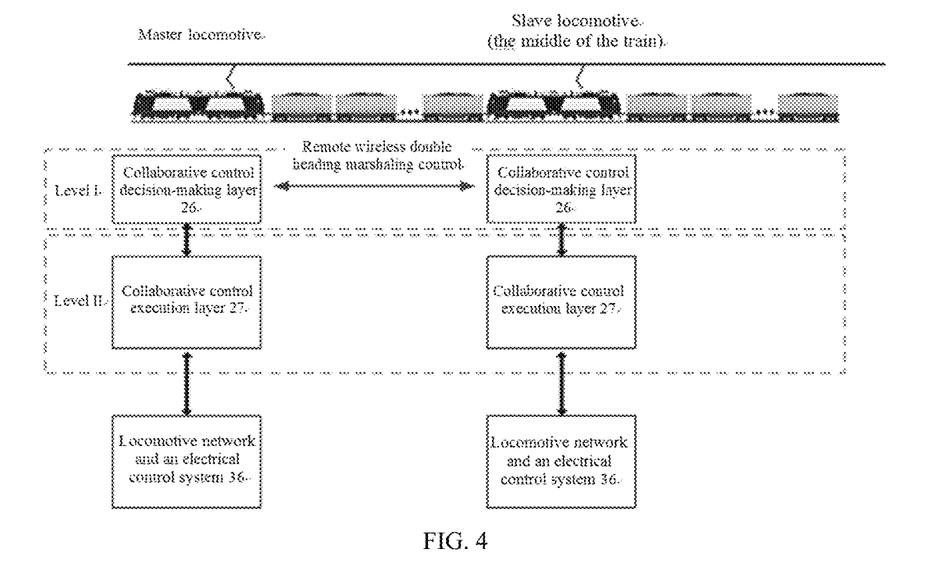
FIG. 4 is a hierarchical block diagram of a system according to an embodiment of the present invention.

As shown in FIG. 4, Embodiment 3 of the invention includes two control management layers built when the traction and electrical braking collaborative processing model based on model prediction is implemented on a long and large train. Taking a remote marshaling mode of one master and one slave as an example, the master locomotive is at the head of the train, and the slave locomotive is in the middle of the train. The first collaborative control decision-making layer (namely, level I) is mainly responsible for wireless double heading marshaling control and traction optimization control decision-making of the heavy-haul combined train, and includes an antenna system 25 and locomotive double heading control units 24, which includes the traction and electrical braking collaborative processing module based on model prediction 1. A collaborative control decision-making layer 26 of the master locomotive is an optimization control core of the entire train, and is characterized by remote double heading management and optimization control of multi-locomotives (including at most 4 locomotives), to implement wireless double heading marshaling of at most 4 locomotives and real-time transmission of internal double heading information. The second vehicle collaborative control execution layer (namely, level II) includes a communication interface module 28, a train safety monitoring device LKJ 29, a train network control and management system 30, a locomotive electrical control interface 31, a locomotive logic control unit LCU 32, a braking control unit 33, and other third-party devices 34 of each locomotive. The second layer implements traction/electric brake collaborative control inside the locomotives through interfaces to a locomotive network and an electrical control system 36, executes and implements optimization strategies, and matches power characteristics of the two locomotives to meet requirements of power balance.

What is claimed is:

1. A longitudinal dynamics traction operation optimization control system for a heavy-haul train, comprising:
    a motion dynamics model, with control instructions of the train as input, an optimization goal of reducing longitudinal impulse, and desired traction/electrical braking force as output;
    an expert system, with the desired traction/electrical braking force output by the said motion dynamics model, output of an optimization output and feedback module as input, to adjust the desired traction/electrical braking force and feed back adjustment results to the said motion dynamics module;
    a prediction model, with the desired traction/electrical braking force output by the said expert system as input, to set an objective function and predict traction/electrical braking force, wherein
    an expression of the objective function set by the prediction model is:

$$\min J(k) = \sum_{i=1}^{p} q_i [F_p(k+i) - F_r(k+i)]^2 + \sum_{j=1}^{M} r_j u^2(k);$$

where $F_r(k+i)$ is desired traction/electrical braking force obtained by the said expert system at time k+i, expressed as: $F_r(k+i)=(1-\alpha^i)F_r(k)+\alpha^i F(k)$; F(k) is actual traction/electrical braking force at time k; $\alpha^i$ is a flexibility coefficient computed by the expert system based on train load; $r_j$ is a weighting coefficient, $u(k)=(G_1^T Q G_1 - R)^T G^T Q[F_r(k+1)-G_2 u(k-1)-He(k)]$, $Q=\text{diag}[q_1, q_2, \ldots, q_p]$, and $q_1, q_2, \ldots, q_p$ are predicted error weighting coefficients; $R=\text{diag}[r_1, r_2, \ldots, r_p]$, and $r_1, r_2, \ldots, r_p$ are control quantity weighting matrices; $H=[h_1, h_2, \ldots, h_p]^T$, and $h_1, h_2, \ldots, h_p$ are feedback coefficient matrices; $G=[g_1, g_2, \ldots, g_p]$, $g_1, g_2, \ldots, g_p$ are impulse response coefficient matrices, $G_1$ is an impulse coefficient matrix for predicting future conditions, and $G_2$ is an impulse coefficient matrix for past known conditions; M is a control time domain length; p is a predicted time domain length; e(k) is a prediction error at time k, $F_p(k)=F_m(k)+He(k)$; $e(k)=F(k)-F_m(k)$; $F_m(k)$ is predicted output at time k; and an optimization output and feedback module, configured to adjust traction/electrical braking force of the train according to the traction/electrical braking force predicted by the prediction model, and feed back the adjusted traction/electrical braking force and real-time monitored coupler force to the expert system.

2. The longitudinal dynamics traction operation optimization control system for the heavy-haul train according to claim 1, further comprising: a data collection module, configured to collect a traction vehicle type, a traction marshaling mode, vehicle model difference data, traction features, traction conditions, electrical braking conditions, line signals, driving permit information, and a train speed in a distributed power marshaling mode of the heavy-haul combined train, wherein the input of the said expert system further comprises the data collected by the said data collection module.

3. The longitudinal dynamics traction operation optimization control system for the heavy-haul train according to claim 1, wherein an expression of the traction/electrical braking force $F_m(k+i)$ predicted by the prediction model at time k+i is:

$$F_m(k+i) = \sum_{i=1}^{M}(Gu(k+i-1) + e(k+i)),$$

where u(k+i−1) is an optimization control rate at time k+i−1.

4. The longitudinal dynamics traction operation optimization control system for the heavy-haul train according to claim 1, wherein the control time domain length M is set to 1<M<p.

5. The longitudinal dynamics traction operation optimization control system for the heavy-haul train according to claim 1, wherein a value range of $\alpha^i$ is 0.2 to 0.6; and a range value of $r_j$ is 0.3 to 0.5.

6. The longitudinal dynamics traction operation optimization control system for the heavy-haul train according to claim 1, further comprising a feature feedback module, configured to detect longitudinal force of the train and divide operation conditions of the train into normal conditions and abnormal conditions, wherein output of the said feature feedback module is connected to the said expert system.

7. The longitudinal dynamics traction operation optimization control system for the heavy-haul train according to claim 1, further comprising an abnormality constraint module, configured to identify abnormal operation conditions of the train and provide safety protection, wherein output of the said abnormality constraint module is connected to the said expert system.

8. A locomotive wireless double heading control unit, embedded with the optimization control system according to claim 1.

9. A double heading train, comprising the locomotive wireless double heading control unit according to claim 8.

10. A longitudinal dynamics traction operation optimization control method for a heavy-haul train, comprising the following steps:

setting the following objective function:

$$\min J(k) = \sum_{i=1}^{p} q_i [F_p(k+i) - F_r(k+i)]^2 + \sum_{j=1}^{M} r_j u^2(k);$$

where $F_r(k+i)$ is desired traction/electrical braking force at time k+i, expressed as: $F_r(k+i)=(1-\alpha^i)F_r(k)+\alpha^i F(k)$; F(k) is actual traction/electrical braking force at time k, $\alpha^i$ is a flexibility coefficient computed based on train load; $r_j$ is a weighting coefficient, $u(k)=(G_1^T Q G_1 - R)^T G^T Q[F_r(k+1)-G_2 u(k-1)-He(k)]$, $Q=\text{diag}[q_1, q_2, \ldots, q_p]$, and $q_1, q_2, \ldots, q_p$ are predicted error weighting coefficients; $R=\text{diag}[r_1, r_2, \ldots, r_p]$, and $r_1, r_2, \ldots, r_p$ are control quantity weighting matrices; $H=[h_1, h_2, \ldots, h_p]^T$ and $h_1, h_2, \ldots, h_p$ are feedback coefficient matrices; $G=[g_1, g_2, \ldots g_p]^T$, $g_1, g_2, \ldots, g_p$ are impulse response coefficient matrices, $G_1$ is an impulse coefficient matrix for predicting future conditions, and $G_2$ is an impulse coefficient matrix for past known conditions; M is a control time domain length; p is a predicted time domain length; e(k) is a prediction error at time k; $F_p(k)=F_m(k)+He(k)$; $e(k)=F(k)-F_m(k)$; $F_m(k)$ is predicted output at time k, and adjusting traction/electrical braking force of the train according to the traction/electrical braking force predicted at time k+i.

11. The method according to claim 10, wherein an expression of the traction/electrical braking force $F_m(k+i)$ predicted at time k+i is:

$$F_m(k+i) = \sum_{i=1}^{p}(Gu(k+i-1) + e(k+i)),$$

where u(k+i−1) is an optimization control rate at time k+i−1.

12. The method according to claim 10, wherein the control time domain length M is set to 1<M<p.

13. The method according to claim 10, wherein a value range of $\alpha^i$ is 0.2 to 0.6; and a range value of $r_j$ is 0.3 to 0.5.

14. The locomotive wireless double heading control unit according to claim 8, wherein the longitudinal dynamics traction operation optimization control system for the heavy-haul train further comprising a data collection module, configured to collect a traction vehicle type, a traction marshaling mode, vehicle model difference data, traction features, traction conditions, electrical braking conditions, line signals, driving permit information, and a train speed in a distributed power marshaling mode of the heavy-haul combined train, wherein the input of the said expert system further comprises the data collected by the said data collection module.

15. The locomotive wireless double heading control unit according to claim 8, wherein the longitudinal dynamics traction operation optimization control system for the heavy-haul train, wherein an expression of the traction/electrical braking force Fm(k+i) predicted by the prediction model at time k+i is: where is an optimization control rate at time k+i−1.

16. The locomotive wireless double heading control unit according to claim 8, wherein the longitudinal dynamics traction operation optimization control system for the heavy-haul train, wherein the control time domain length M is set to 1<M<p.

17. The locomotive wireless double heading control unit according to claim 8, wherein the longitudinal dynamics traction operation optimization control system for the heavy-haul train, wherein a value range of $\alpha i$ is 0.2 to 0.6; and a range value of rj is 0.3 to 0.5.

18. The locomotive wireless double heading control unit according to claim 8, wherein the longitudinal dynamics traction operation optimization control system for the heavy-haul train further comprising a feature feedback module, configured to detect longitudinal force of the train and divide operation conditions of the train into normal conditions and abnormal conditions, wherein output of the said feature feedback module is connected to the said expert system.

19. The locomotive wireless double heading control unit according to claim 8, wherein the longitudinal dynamics traction operation optimization control system for the heavy-haul train further comprising an abnormality constraint module, configured to identify abnormal operation conditions of the train and provide safety protection, wherein output of the said abnormality constraint module is connected to the said expert system.

* * * * *